United States Patent
Nakano

(10) Patent No.: US 7,626,943 B2
(45) Date of Patent: Dec. 1, 2009

(54) COMMUNICATION DEVICE, COMMUNICATION METHOD, RECORDING MEDIUM AND PROGRAM

(75) Inventor: Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 775 days.

(21) Appl. No.: 10/503,931

(22) PCT Filed: Oct. 27, 2003

(86) PCT No.: PCT/JP03/13682

§ 371 (c)(1),
(2), (4) Date: Aug. 13, 2004

(87) PCT Pub. No.: WO2004/062204

PCT Pub. Date: Jul. 22, 2004

(65) Prior Publication Data

US 2005/0147108 A1    Jul. 7, 2005

(30) Foreign Application Priority Data

Dec. 26, 2002    (JP)    ............................. 2002-376558

(51) Int. Cl.
*H04L 12/28*    (2006.01)
(52) U.S. Cl. .................... 370/254; 713/182; 726/26; 726/27; 726/30
(58) Field of Classification Search ................. 713/182
See application file for complete search history.

(56) References Cited

U.S. PATENT DOCUMENTS

| 5,477,531 A | 12/1995 | McKee et al. |
| 6,012,096 A | 1/2000 | Link et al. |
| 2001/0020254 A1* | 9/2001 | Blumenau et al. ........... 709/229 |
| 2002/0002541 A1* | 1/2002 | Williams ...................... 705/51 |
| 2002/0120727 A1 | 8/2002 | Curley et al. |
| 2003/0105831 A1* | 6/2003 | O'Kane ....................... 709/217 |
| 2004/0098583 A1* | 5/2004 | Weber ......................... 713/168 |

(Continued)

FOREIGN PATENT DOCUMENTS

EP    0 813 320 A2    12/1997

(Continued)

OTHER PUBLICATIONS

George Xylomenos and George C. Polyzos, TCP and UDP Performance over a Wireless LAN, Proceedings of teh IEEE INFOCOM, 1999, pp. 439-446.*

(Continued)

*Primary Examiner*—Chirag G Shah
*Assistant Examiner*—Otis L Thompson, Jr.
(74) *Attorney, Agent, or Firm*—Oblon, Spivak, McClelland, Maier & Neustadt, L.L.P.

(57) ABSTRACT

A data transmitting apparatus includes a transmitting unit that transmits a check packet to a data receiving apparatus, and a control unit that receives an acknowledgement message to the check packet. The acknowledgement message includes acknowledgement information based on shared data shared with the data receiving apparatus. The transmitting apparatus also includes a timer configured to determine whether a response time of the acknowledgement message is less than a predetermined time and a judgment unit that judges whether a subsequent content data transmitted to the data receiving apparatus will be limited in usage right based on a comparison result and the determination of the timer. If the acknowledgement message is not received, the judgment unit determines that the data receiving apparatus is connected to the data transmitting apparatus through a second network and subsequent content data transmitted is limited in usage right.

24 Claims, 9 Drawing Sheets

U.S. PATENT DOCUMENTS

| | | |
|---|---|---|
| 2004/0268131 A1 | 12/2004 | Kudo et al. |
| 2005/0078944 A1* | 4/2005 | Risan et al. .................. 386/94 |
| 2005/0287991 A1 | 12/2005 | Shima |
| 2006/0153096 A1 | 7/2006 | Nakano |
| 2006/0154620 A1 | 7/2006 | Shima |
| 2006/0209689 A1 | 9/2006 | Nakano et al. |

FOREIGN PATENT DOCUMENTS

| | | |
|---|---|---|
| JP | 5-7218 | 1/1993 |
| JP | 11-203249 | 7/1999 |
| JP | 2001-285284 | 10/2001 |
| JP | 2001285284 A * | 10/2001 |
| KR | 2001-0004137 * | 1/2001 |
| WO | WO 01/76189 A2 | 10/2001 |
| WO | WO 2004/014037 A1 | 2/2004 |
| WO | WO 2004/030311 A1 | 4/2004 |

OTHER PUBLICATIONS

"DTCP vol. 1 Supplement E Revision 1.0 (Informational Version)", Nov. 24, 2003, pp. 1-19.

Ian Fried. 'Apple limits iTunes file sharing'. [online]. CNET News.com. May 27, 2003. Retrieved from internet: <URL: http:news.com.com/2100-1027_3-1010541.html?tag=cd_mh>.

Hitachi Ltd. et al. 'Digital Transmission Content Protection Specification vol. 1 Revision 1. 2a (informational Version)' [online]. digital Transmission Licensing Administrator. Feb. 25, 2002. Retrieved from inte4rnet: <URL: http://web.archive.org/web/20030604012332/www.ctcp.com/data/info_vl.pdf>.

Hachiro Endo, Batsuryu Man no Tameno Pasokon Katsuyo Jissen Koza-96- Network Settei no Kakunin Ho Ho; Material Flow, Kabushiki Kaisha Ryutsu Kenkyusha, vol. 43, No. 5, p. 125, Jun. 1, 2002.

Patent Abstracts of Japan, JP 2001-285284, Oct. 12, 2001.

Patent Abstracts of Japan, JP 2002-033733, Jan. 31, 2002.

* cited by examiner

29

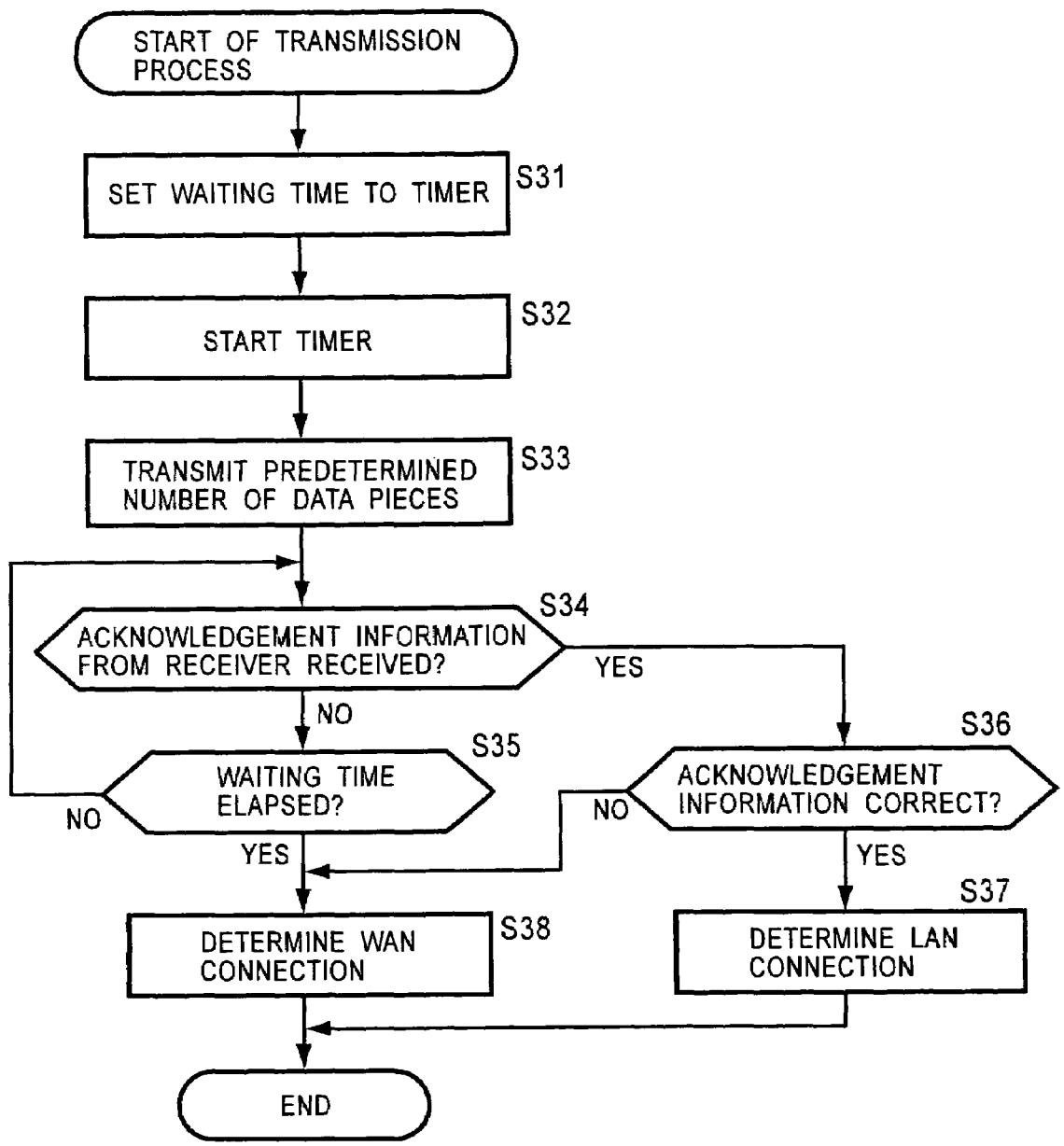

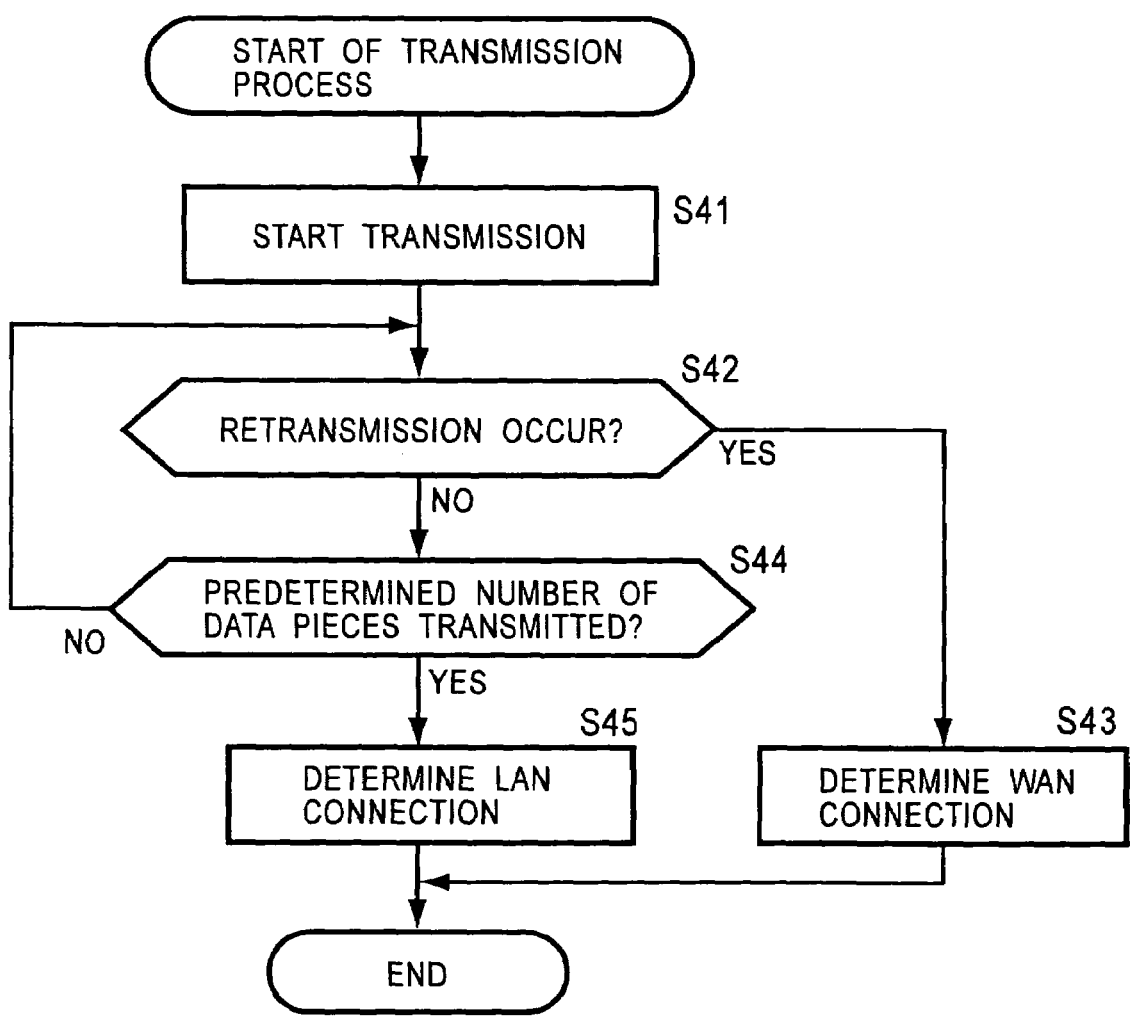

COMMUNICATION DEVICE, COMMUNICATION METHOD, RECORDING MEDIUM AND PROGRAM

TECHNICAL FIELD

The present invention relates to a telecommunications apparatus and a method, a storage medium, and a program and, in particular, to a telecommunications apparatus and a method, a storage medium, and a program suitable for determining whether data communication takes place across a WAN such as the Internet or on a LAN in a house.

BACKGROUND ART

In recent years, with the widespread use of public wide area networks such as the Internet (hereinafter referred to as "WAN") and local area networks installed in houses (hereinafter referred to as "LAN") and along with the increased communication rate of these networks, a variety of data have been communicated by using personal computers and various types of electronic AV devices over these WANs and LANs.

This widespread use of these networks enables content data, such as video data, audio data, and program data, to be conveniently sold or shared by individuals. However, content data which is protected by copyright is sometimes illegally distributed because of such convenience. To prevent this, various types of countermeasures are proposed.

For example, some music download services limit the storage medium that stores the downloaded audio data to a storage medium having predetermined protection against being copied.

Additionally, for example, in communication of content data over a small network, such as a network based on IEEE 1394 standard, the encrypted content data are transferred after authentication to prevent the content data from being transferred to an unauthorized device.

Unfortunately, a communication scheme that prevents the illegal distribution of content data has not yet been established for IP protocols, which are commonly used for WAN communication. One possible solution is to limit the area of communication to a LAN when distributing the content data over an IP protocol. To limit the communication of content data within the LAN, it must be determined whether or not the other side communicating the content data is located on a LAN or a WAN. A method for such a determination, however, has not yet been established.

DISCLOSURE OF INVENTION

Accordingly, it is an object of the present invention to provide a scheme for determining whether the other side communicating the content data is located on a LAN or across a WAN.

A first telecommunications apparatus according to the present invention includes transmission means for transmitting a predetermined number of check packets after information indicating the sequence of the check packets is recorded in the check packets, receiving means for receiving transmitted check packets, checking means for checking the sequence of the predetermined number of check packets received by the receiving means, and determination means for determining, based on the checking result of the checking means, whether or not another apparatus for communication is located on the same first network as itself or across a second network different from the first network.

The determination means may determine that another apparatus for communication is located on the first network if the checking means determines that the predetermined number of check packets received by the receiving means is in sequence, or the determination means may determine that another apparatus for communication is located across the second network if the checking means determines that the predetermined number of check packets received by the receiving means is out of sequence.

The first network may be a local area network (LAN) and the second network may be a wide area network (WAN).

The communication means and the receiving means may work with a UDP protocol.

A first telecommunications method according to the present invention includes a step of transmitting a predetermined number of check packets after information indicating the sequence of the check packets is recorded in the check packets, a step of receiving transmitted check packets, a step of checking the sequence of the predetermined number of check packets received in the receiving step, and a step of determining, based on the checking result in the checking step, whether or not another apparatus for communication is located on the same first network as itself or across a second network different from the first network.

A first storage medium according to the present invention includes a program including a step of transmitting a predetermined number of check packets after information indicating the sequence of the check packets is recorded in he check packets, a step of receiving transmitted check packets, a step of checking the sequence of the predetermined number of check packets received in the receiving step, and a step of determining, based on the checking result in the checking step, whether or not another apparatus for communication is located on the same first network as itself or across a second network different from the first network.

A first program according to the present invention allows a computer to execute a step of transmitting a predetermined number of check packets after information indicating the sequence of the check packets is recorded in the check packets, a step of receiving transmitted check packets, a step of checking the sequence of the predetermined number of check packets received in the receiving step, and a step of determining, based on the checking result in the checking step, whether or not another apparatus for communication is located on the same first network as itself or across a second network different from the first network.

A second telecommunications apparatus according to the present invention includes transmission means for transmitting a predetermined number of check packets, receiving means for receiving transmitted check packets, information generating means for generating acknowledgement information and sending back the acknowledgement information after receiving the predetermined number of check packets by the receiving means, acquiring means for acquiring the acknowledgement information sent back from another apparatus for communication, measuring means for measuring an elapsed time from the transmission of the predetermined number of check packets by the transmission means to the reception of the acknowledgement information by the acquiring means, and determination means for determining, based on a measuring result of the measuring means, whether or not another apparatus for communication is located on the same first network as itself or across a second network different from the first network.

The determination means may determine that another apparatus for communication is located on the first network if the elapsed time measured by the measuring means is smaller than a predetermined threshold value or may determine that another apparatus for communication is located across the second network if the elapsed time measured by the measuring means is greater than or equal to the predetermined threshold value.

The first network may be a local area network (LAN) and the second network may be a wide area network (WAN).

The communication means and the receiving means may work with a TCP protocol or a UDP protocol.

A second telecommunications method according to the present invention includes a step of transmitting a predetermined number of check packets, a step of receiving transmitted check packets, a step of generating acknowledgement information and sending back the acknowledgement information after receiving the predetermined number of check packets in the receiving step, a step of acquiring the acknowledgement information sent back from another apparatus for communication, a step of measuring an elapsed time from the transmission of the predetermined number of check packets in the transmitting step to the reception of the acknowledgement information in the acquiring step, and a step of determining, based on a measuring result in the measuring step, whether or not another apparatus for communication is located on the same first network as itself or across a second network different from the first network.

A second storage medium includes a program including a step of transmitting a predetermined number of check packets, a step of receiving transmitted check packets, a step of generating acknowledgement information and sending back the acknowledgement information after receiving the predetermined number of check packets in the receiving step, a step of acquiring the acknowledgement information sent back from another apparatus for communication, a step of measuring an elapsed time from the transmission of the predetermined number of check packets in the transmitting step to the reception of the acknowledgement information in the acquiring step, and a step of determining, based on a measuring result in the measuring step, whether or not another apparatus for communication is located on the same first network as itself or across a second network different from the first network.

A second program according to the present invention allows a computer to execute a step of transmitting a predetermined number of check packets, a step of receiving transmitted check packets, a step of generating acknowledgement information and sending back the acknowledgement information after receiving the predetermined number of check packets in the receiving step, a step of acquiring the acknowledgement information sent back from another apparatus for communication, a step of measuring an elapsed time from the transmission of the predetermined number of check packets in the transmitting step to the reception of the acknowledgement information in the acquiring step, and a step of determining, based on a measuring result in the measuring step, whether or not another apparatus for communication is located on the same first network as itself or across a second network different from the first network.

A third telecommunications apparatus according to the present invention includes transmission means for transmitting a predetermined number of check packets and retransmitting the check packets if a communication error occurs, and determination means for determining that another apparatus for communication is located on the same first network as itself if the check packets are not retransmitted by the transmission means or determining that another apparatus for communication is located across a second network different from the first network if the check packets are retransmitted by the transmission means.

The transmission means may work with a Transmission Control Protocol (TCP).

The first network may be a local area network (LAN) and the second network may be a wide area network (WAN).

A third telecommunications method according to the present invention includes a step of transmitting a predetermined number of check packets and retransmitting the check packets if a communication error occurs and, a step of determining that another apparatus for communication is located on the same first network as itself if the check packets are not retransmitted in the transmitting step or determining that another apparatus for communication is located across a second network different from the first network if the check packets are retransmitted in the transmitting step.

A third storage medium according to the present invention includes a program including a step of transmitting a predetermined number of check packets and retransmitting the check packets if a communication error occurs, and a step of determining that another apparatus for communication is located on the same first network as itself if the check packets are not retransmitted in the transmitting step or determining that another apparatus for communication is located across a second network different from the first network if the check packets are retransmitted in the transmitting step.

A third program according to the present invention allows a computer to execute a step of transmitting a predetermined number of check packets and retransmitting the check packets if a communication error occurs and a step of determining that another apparatus for communication is located on the same first network as itself if the check packets are not retransmitted in the transmitting step or determining that another apparatus for communication is located across a second network different from the first network if the check packets are retransmitted in the transmitting step.

In the first telecommunications apparatus, telecommunications method, and program according to the present invention, the check packets in which information indicating the sequence of the check packets is recorded are received. The sequence of a predetermined number of the check packets is checked and the result of the check is used to determine whether another apparatus for communication is located on the same first network as itself or across a second network different from the first network.

In the second telecommunications apparatus, telecommunications method, and program according to the present invention, a predetermined number of check packets are transmitted to another apparatus for communication, and acknowledgement information sent back from the apparatus is received. In addition, an elapsed time from the transmission of the predetermined number of check packets to the reception of the acknowledgement information is measured. The result of the measurement is used to determine whether the apparatus for communication is located on the same first network as itself or across a second network different from the first network.

In the third telecommunications apparatus, telecommunications method, and program according to the present invention, a predetermined number of check packets are transmitted to another apparatus for communication and the check packets are retransmitted if a communication error occurs. If the check packets are not retransmitted, it is determined that another apparatus for communication is located on the same first network as itself. If the check packets are retransmitted, it is determined that another apparatus for communication is located across a second network different from the first network.

BRIEF DESCRIPTION OF THE DRAWINGS

FIG. 9 is a flow chart explaining a transmission process in the second configuration of the communication unit 29; and FIG. 10 is a flow chart explaining a transmission process over a TCP protocol.

BEST MODE FOR CARRYING OUT THE INVENTION

Figure 1:
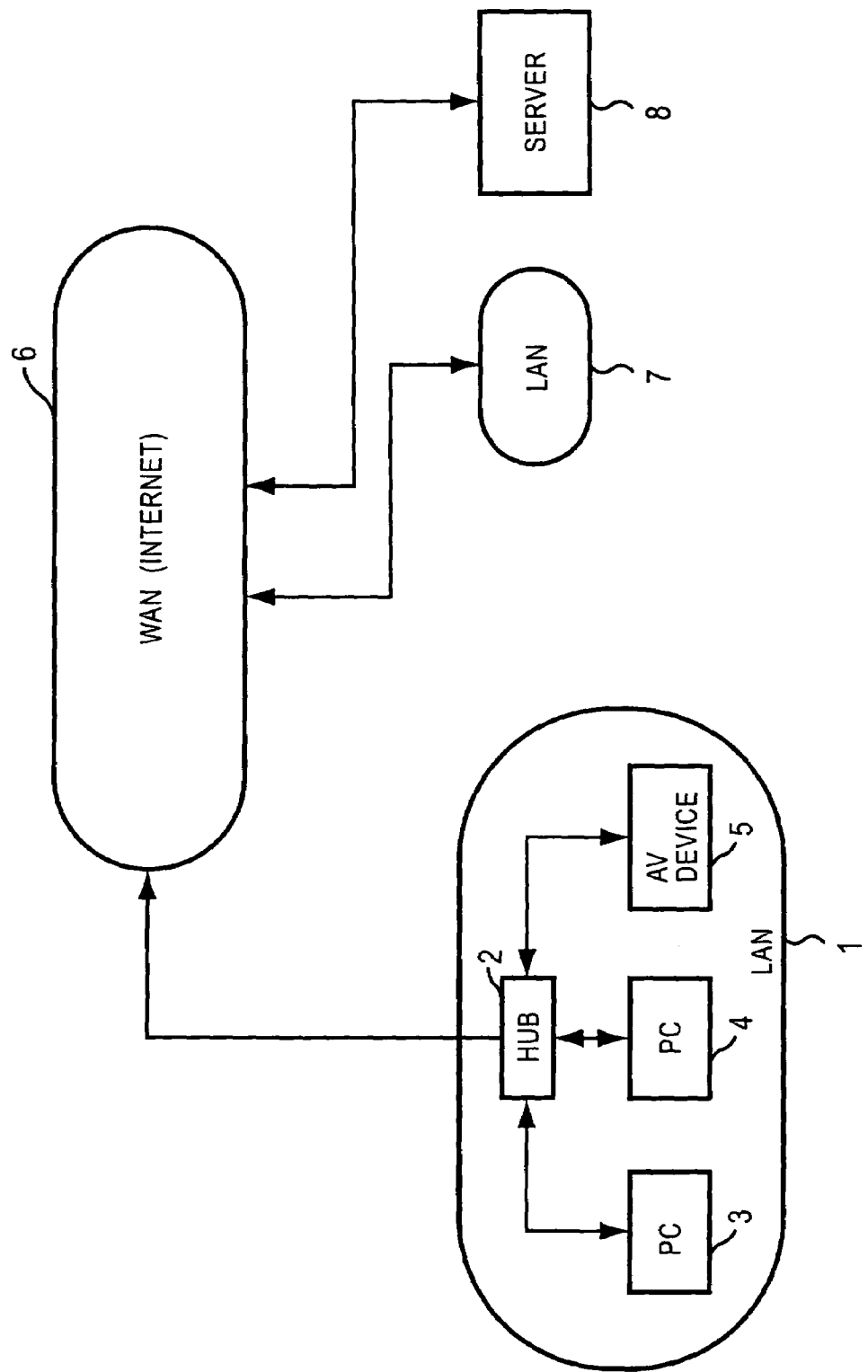
FIG. 1 is a block diagram of a configuration of a telecommunications system to which the present invention is applied.

FIG. 1 shows a configuration of a telecommunications system including a LAN having personal computers and AV devices according to an embodiment of the present invention. In this telecommunication system, LANs 1 and 7, and a server 8 are connected to one another across a WAN 6, such as the Internet.

The LAN 1 includes personal computers (PCs) 3 and 4, and an AV device 5, all connected via a switching hub 2. The LAN 1 is, for example, used for communication among specific individuals or a family in a house. The switching hub 2 is connected to the personal computers 3 and 4 and the AV device 5 via a high-speed interface, such as Ethernet (R) 100BASE-TX. Data communication can take place among the personal computers 3 and 4 and the AV device 5 at a rate of about 100 Mbps with a sufficiently low error rate. The personal computers (PCs) 3 and 4 and the AV device 5 can communicate with the LAN 7 or the server 8 via the switching hub 2 and the WAN 6.

The personal computer (PC) 3, upon transmission of content data, can determine whether or not the other side communicating the content data is located on the LAN 1, for example, the personal computer 4 or is located across the WAN 6, for example, the server 8.

Likewise, the personal computer 4 and the AV device 5, upon the transmission of content data, can determine whether the other side communicating the content data is located on the LAN 1, for example, the personal computer 3 or is located across the WAN 6, for example, the server 8.

The LAN 7 has the same configuration as that of the LAN 1, however, it is managed by a different user from the LAN 1. The server 8 is managed by a different user from the LANs 1 and 7.

Figure 2:
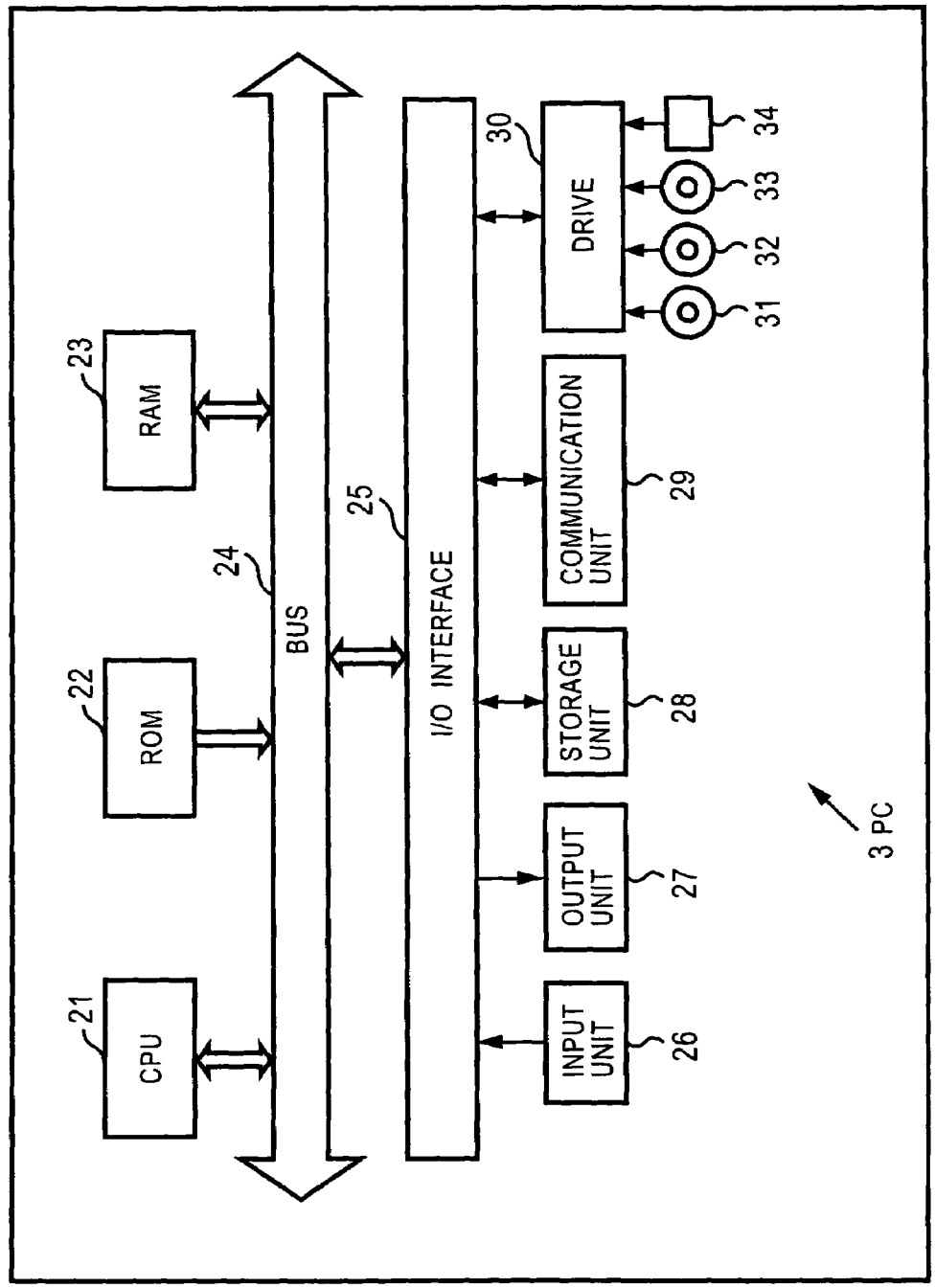
FIG. 2 shows a configuration of a personal computer shown in FIG. 1.

FIG. 2 shows a configuration of the personal computer 3. The personal computer 3 incorporates a central processing unit (CPU) 21, to which an I/O interface 25 is connected via a bus 24. A read only memory (ROM) 22 and a random access memory (RAM) 23 are connected to the bus 24.

The I/O interface 25 includes an input unit 26 composed of I/O devices, such as a keyboard and a mouse, by which a user enters operation commands, an output unit 27 which outputs video signals to display operation screens on a display unit, a storage unit 28 which includes a hard disk drive to store programs and other various types of data, and a communication unit 29 which includes an Ethernet (R) interface to transmit and receive data via a 100BASE-TX cable connected to the switching hub 2.

Instead of the Ethernet (R) interface, the communication unit 29 may include a universal serial bus (USB), or a high-speed interface, such as an Institute of Electrical and Electronics Engineers (IEEE) 1394.

Additionally, a drive 30 which reads and writes data to and from storage media, such as a magnetic disk 31, an optical disk 32, an optical magnetic disk 33, and a semiconductor memory 34, is connected to the I/O interface 25.

The CPU 21 performs various types of processes, which will be described below, under the control of a program in the ROM 22 or in the RAM 23. The program is read from the magnetic disk 31, the optical disk 32, the optical magnetic disk 33, or the semiconductor memory 34, is stored in the storage unit 28, and is then loaded from the storage unit 28 to the RAM 23. The RAM 23 also stores data required for the CPU 21 to perform the various types of processes.

Figure 3:
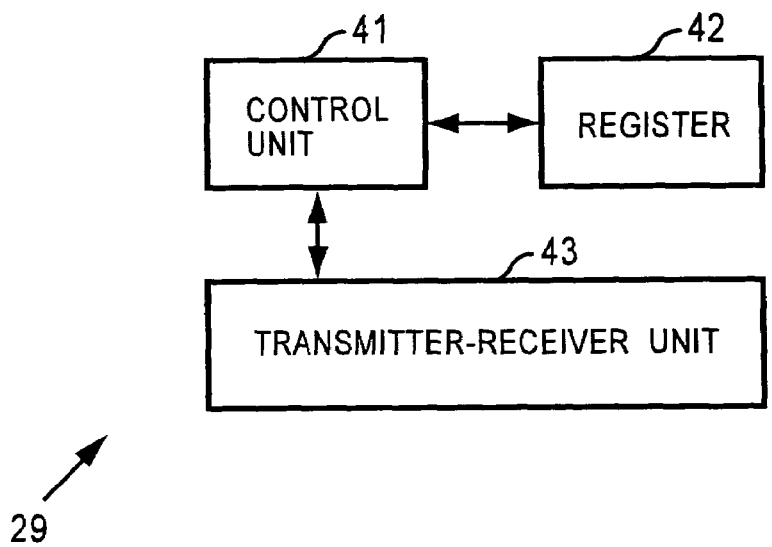
FIG. 3 shows a first configuration of a communication unit 29 shown in FIG. 2.

FIG. 3 shows a first configuration of a functional block achieved by the communication unit 29 in response to controls of the CPU 21. A control unit 41 controls a transmitter-receiver unit 43 which transmits and receives data over the user datagram protocol (UDP), which is one of the communication protocols. The control unit 41 accesses a register 42. Before the transmitter-receiver unit 43 transmits content data in response to the control of the control unit 41, it transmits a predetermined number of check packets to determine whether the other side communicating the content data is located on the LAN 1 or across the WAN 6.

Figure 4:
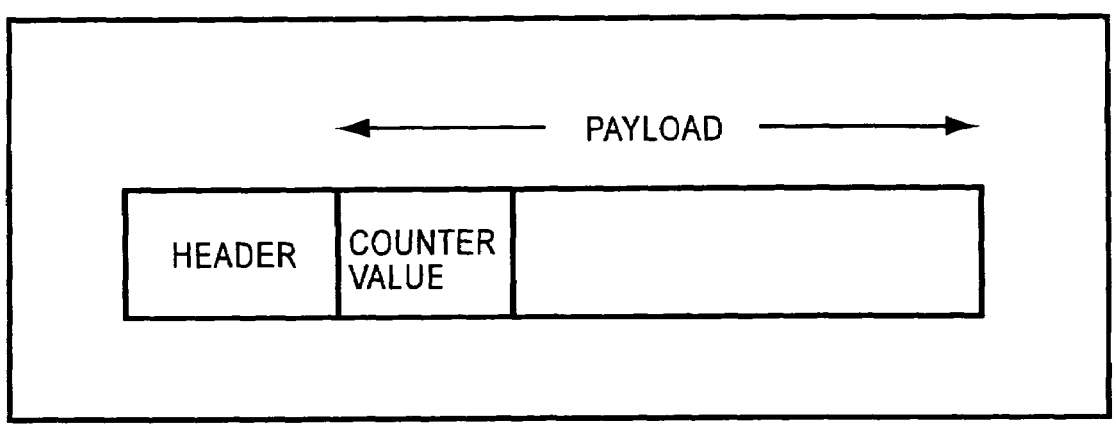
FIG. 4 shows an example of a check packet.

FIG. 4 shows an example of the check packet. In particular, this check packet has a payload to store a counter value generated by the control unit 41.

The PC 4 and the AV device 5 have the same hardware or software functional block as that of the communication unit 29 shown in FIG. 3. In addition, various types of apparatuses on the LAN 7 and the server 8 have the same functional block.

An outline of how to determine whether or not the other side communicating the content data is located on the LAN 1 or across the WAN 6 will now be described with reference to the first configuration of the communication unit 29.

The UDP protocol defines that, in the case of a communication error, a packet that is not transmitted correctly is discarded and is not retransmitted. Using this characteristic, whether or not the other side communicating the content data is located on the LAN 1 or across the WAN 6 can be determined.

More specifically, in a high-speed communication with a peer located on the LAN 1, the switching hub 2 transmits all packets to the peer without changing the sequence of the packets, whereas in a high-speed communication with a peer across the WAN 6, a communication error occurs due to a wide area networking and the UDP protocol discards the erroneous packet. Therefore, the peer does not receive some packets or receives the packets in a different order from the transmission order. This is used to determine whether the other side communicating the content data is located on the LAN 1 or across the WAN 6.

Figure 5:
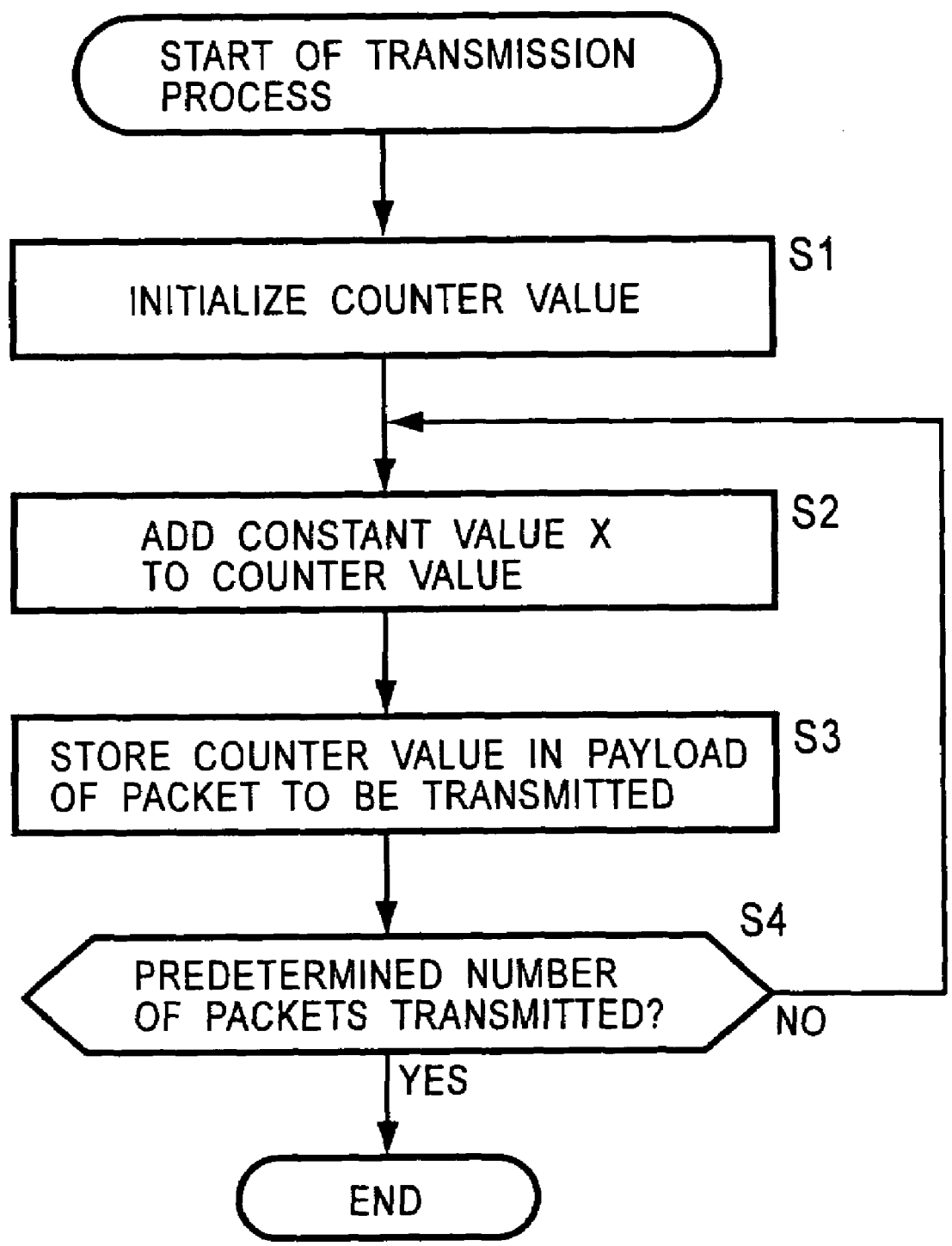
FIG. 5 is a flow chart explaining a transmission process in the first configuration of the communication unit 29.

A transmission process in the first configuration of the communication unit 29 shown in FIG. 3 will now be described with reference to the flow chart in FIG. 5. This transmission process determines whether the other side communicating the content data is located on the LAN 1 or across the WAN 6 before the communication of content data takes place.

In step S1, the control unit 41 assigns an initial value A to a value in a counter therein (counter value). In step S2, the control unit 41 increments the counter by a constant value X, then outputs the counter value to the transmitter-receiver unit 43. In step S3, the transmitter-receiver unit 43, in response to the control of the control unit 41, writes the counter value from the control unit 41 into the payload of a check packet and then transmits it to the other side communicating the content data.

In step S4, the control unit 41 determines whether the transmitter-receiver unit 43 transmits all the predetermined number of check packets. If all the predetermined number of check packets is not yet transmitted, the process returns to step S2 and the subsequent processes are repeated. If, in step S4, the control unit 41 determines that all the predetermined number of check packets is transmitted, the transmission process is completed. As described above, a plurality of check packets having sequential counter values are transmitted to the receiver.

Figure 6:
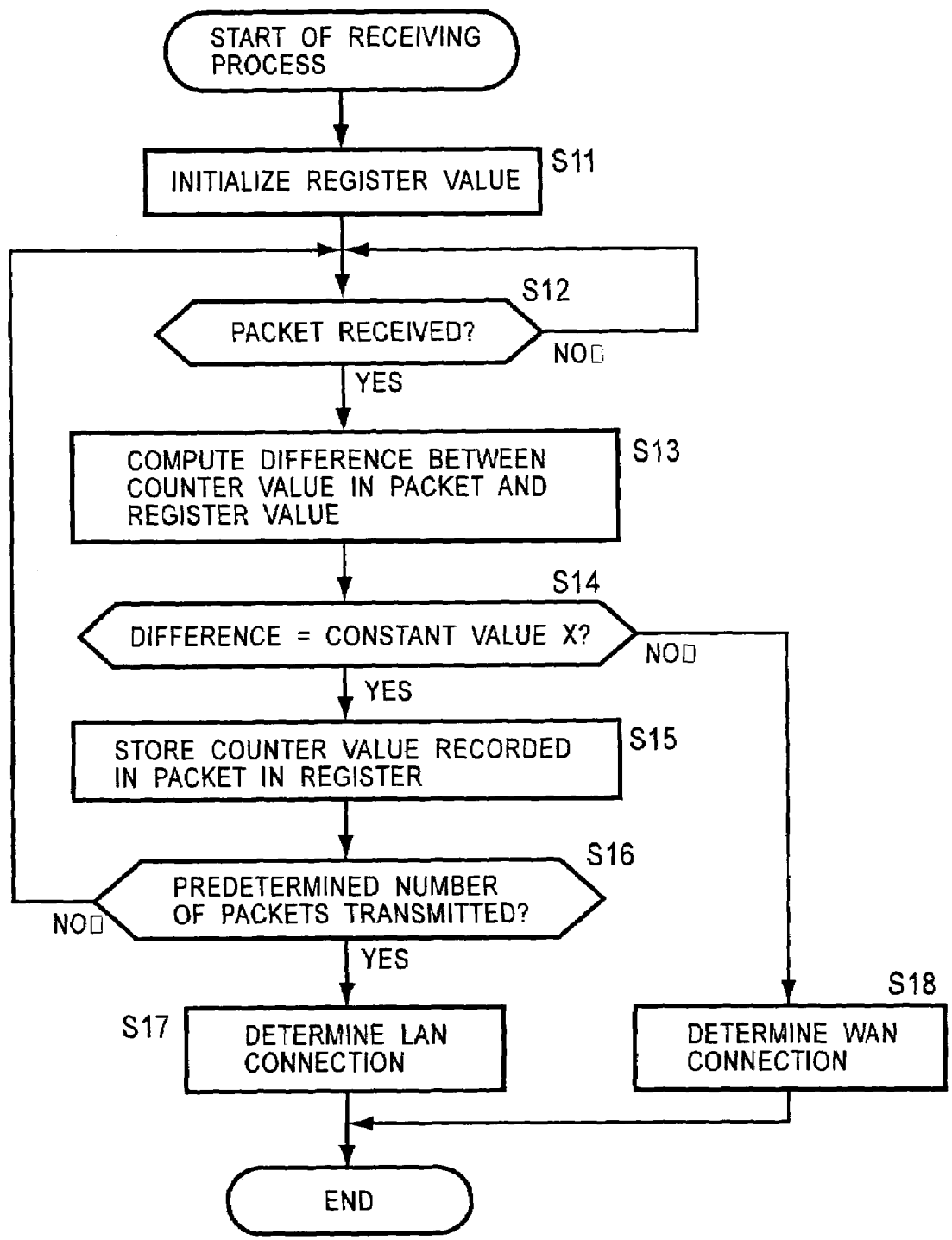
FIG. 6 is a flow chart explaining a receiving process in the first configuration of the communication unit 29.

A receiving process corresponding to the above described transmission process in the first configuration of the communication unit 29 will now be described with reference to a flow chart in FIG. 6. In step S11, the control unit 41 stores an initial value A in the register 42. In step S12, the transmitter-receiver unit 43 waits until the check packet transmitted from a transmitter is received. When the transmitter-receiver unit 43 receives the check packet, the process proceeds to step S13.

In step S13, the control unit 41 computes the difference between a counter value in a payload of the check packet received in step S12 and the value in the register 42. In step S14, the resultant difference computed in step S13 is checked to determine if it is equal to the constant value X. If the difference is equal to the constant value X, a check packet is not lost and the packet is received in the transmission sequence, and then the process proceeds to step S15.

In step S15, the control unit 41 stores the counter value recorded in the packet in step S13 in the register 42. In step S16, the control unit 41 determines whether the transmitter-receiver unit 43 receives all the predetermined number of check packets. If all the predetermined number of check packets is not yet received, the process returns to step S12 and the subsequent processes are repeated. Then, if, in step S16, it is determined that all the predetermined number of check packets is received, the process proceeds to step S17.

In step S17, the control unit 41 determines LAN connection, representing that the transmitter is located on the LAN 1.

In step S14, if the difference computed in step S13 is not equal to the constant value X, a check packet is lost or the check packet is received in a different sequence from the transmission sequence. Accordingly, the process proceeds to step S18. In step S18, the control unit 41 determines WAN connection, representing that the transmitter is located on the WAN 6. This is the end of the description of the receiving process.

For example, if it is determined that the communication takes place across a WAN connection in the receiving process, the usage of content data subsequently transmitted from the transmitter is strictly limited. In contrast, if it is determined that the communication takes place across a LAN connection, the usage of content data subsequently transmitted from the transmitter is moderately limited. This prevents the content data from being distributed across a WAN without impairing personal use on a LAN.

Figure 7:
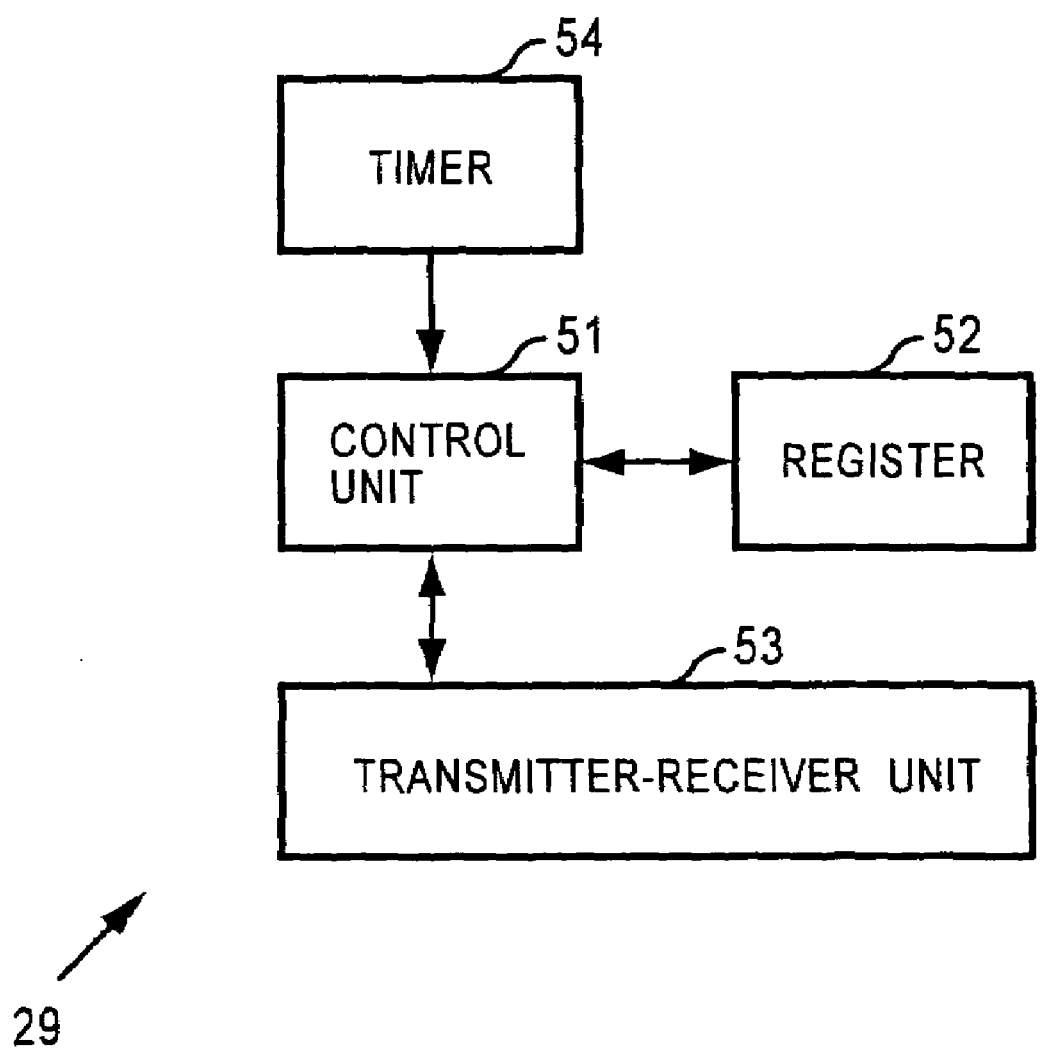
FIG. 7 shows a second configuration of the communication unit 29 shown in FIG. 2.

FIG. 7 shows a second configuration of a functional block achieved by the communication unit 29 in response to controls of the CPU 21. A control unit 51 controls a transmitter-receiver unit 53, which transmits and receives data over the TCP protocol or the UDP protocol. The control unit 51 also accesses a register 52. Before the transmitter-receiver unit 53 transmits content data in response to the control of the control unit 51, it transmits a predetermined number of check packets to determine whether the other side communicating the content data is located on the LAN 1 or across the WAN 6. A timer 54 measures time in response to the control of the control unit 51.

The PC 4 and the AV device 5 have the same hardware or software functional blocks as those of the communication unit 29 shown in FIG. 7. In addition, various types of apparatuses on the LAN 7 and the server 8 have the same functional blocks.

An outline of how to determine whether or not the other side communicating the data is located on the LAN 1 or across the WAN 6 will now be described with reference to the second configuration of the communication unit 29. In a communication on the LAN 1, the switching hub 2 ensures a high-speed communication rate. In contrast, in a communication across the WAN 6, the communication rate is decreased due to various reasons compared to the communication rate on the LAN 1. Based on this, it is determined whether or not the other side communicating the data is located on the LAN 1 or across the WAN 6.

Figure 8:
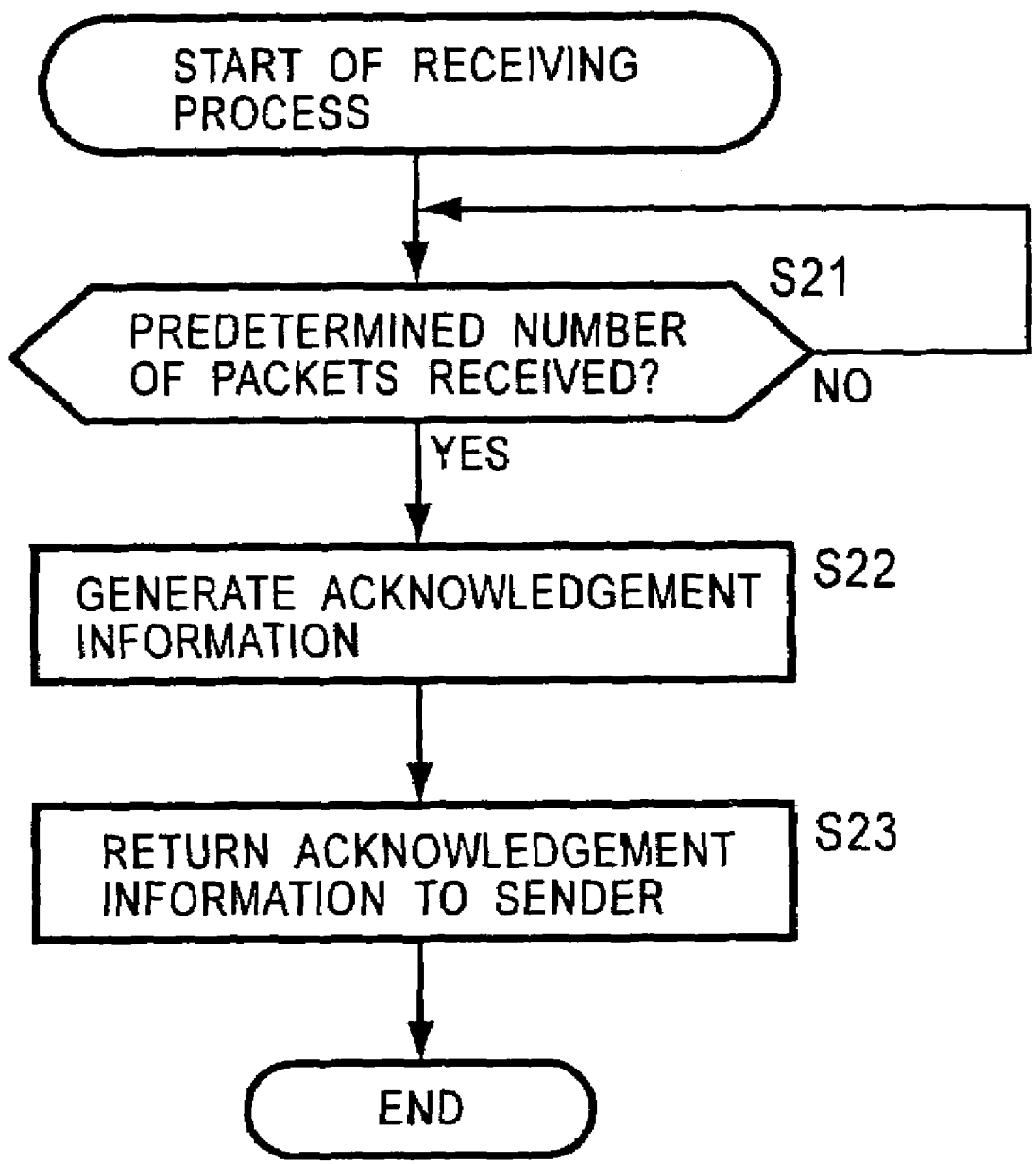
FIG. 8 is a flow chart explaining a receiving process in the second configuration of the communication unit 29.

A receiving process in the second configuration of the communication unit 29 will now be described with reference to the flow chart in FIG. 8. This receiving process starts when a transmitter transmits a check packet.

In step S21, the control unit 51 determines whether or not the transmitter-receiver unit 53 receives all the predetermined number of check packets. The control unit 51 waits until it is determined that all the predetermined number of check packets is received. If it is determined that all the predetermined number of check packets is received, the process proceeds to step S22. In step S22, the control unit 51 generates acknowledgement information indicating that all the predetermined number of check packets is received, and outputs the information to the transmitter-receiver unit 53. In step S23, the transmitter-receiver unit 53 transmits the acknowledgement information to the transmitter. Preferably, the acknowledgement information cannot be forged by a third party for security reasons. For example, the transmitter and the receiver share key information as privileged information. All data or part of the data is transmitted with a hash and the key information. This is the end of the description of the receiving process.

A transmission process in the second configuration of the communication unit 29 will now be described with reference to the flow chart in FIG. 9. In step S31, the control unit 51 sets a waiting time in the timer 54. The waiting time is determined so as to be sufficient to receive the acknowledgement information sent back from a transmitter located on the LAN 1 after transmitting a predetermined number of check packets.

In step S32, the timer 54 starts measuring time in response to the control of the control unit 51. In step S33, the transmitter-receiver unit 53 transmits a predetermined number of check packets in response to the control of the control unit 51. A random number may be written into payloads of all check packets for every checking. The receiver generates the acknowledgement information with a hash and key information as described above to prevent the acknowledgement information from being forged improperly.

In step S34, the control unit 51 determines whether or not the transmitter-receiver unit 53 receives the acknowledgement information from the receiver. If the control unit 51 determines that the acknowledgement information is not received, then the process proceeds to step S35. In step S35, the control unit 51 checks if the waiting time, which is set in step S31, has elapsed or not. If it is determined that it has not elapsed, the process returns to step S34 and then the subsequent steps are repeated.

If, in step S34, the control unit 51 determines that the acknowledgement information is received, the process proceeds to step S36, where the control unit 51 checks if the acknowledgement information is correct or not. If it is not correct, the process proceeds to step S38. Otherwise, the process proceeds to step S37. In step S37, the control unit 51 determines that the communication takes place over a LAN connection, that is, the receiver is located on the LAN 1. In particular, to check the acknowledgement information, the transmitter may compute expected acknowledgement information as in the receiving process to compare with a value from the receiver.

If, in step S35, it is determined that the waiting time has elapsed, the process proceeds to step S38. In step S38, the control unit 51 determines that the communication takes place across a WAN connection, that is, the receiver is located across the WAN 6. This is the end of the description of the transmission process.

For example, if it is determined that the communication takes place across a WAN connection in this transmission process, subsequent transmission of content data is stopped. In contrast, if it is determined that the communication takes place on a LAN connection, the subsequent transmission of content data is allowed. This prevents the content data from being distributed across a WAN without impairing personal use on a LAN.

A third communication via a Transmission Control protocol (TCP) in the communication unit 29 will now be described. In the TCP protocol, when a communication error occurs, an erroneous packet is retransmitted until all the packets are transmitted successfully. If a high-speed TCP communication that exceeds the speed of a WAN takes place, retransmissions do not occur on the LAN 1, however, retransmissions occur across the WAN 6.

A transmission process to determine whether or not the receiver is located on the LAN 1 or across the WAN 6 by using this characteristic of the TCP protocol will now be described with reference to the flow chart in FIG. 10. This transmission process is performed before the communication of content data. In this case, the configuration of the communication unit 29 is identical to that in FIG. 3.

In step S41, the transmitter-receiver unit 43 starts to transmit check packets in response to the control of the control unit 41. In step S42, the control unit 41 determines whether or not the transmitter-receiver unit 43 retransmits the check packets. If it is determined that retransmission of the check packets occurs, the process proceeds to step S43.

In step S43, the control unit 41 determines WAN connection, representing that the receiver is located on the WAN 6.

If, in step S42, it is determined that retransmission of the check packets does not occur, the process proceeds to step S44. In step S44, the control unit 41 determines whether or not the transmitter-receiver unit 43 transmits a predetermined number of check packets. If it is determined that the predetermined number of check packets is not transmitted, the process returns to step S42 and then the subsequent process is repeated. Subsequently, if, in step S44, it is determined that the predetermined number of check packets is transmitted, the process proceeds to step S45.

In step S45, the control unit 41 determines LAN connection, representing that the receiver is located on the LAN 1. This is the end of the description of the transmission process.

For example, if it is determined that the communication takes place across a WAN connection in this transmission process, subsequent transmission of content data is stopped. In contrast, if it is determined that the communication takes place across a LAN connection, the subsequent transmission of content data is allowed. This can prevent the content data from being distributed across a WAN without impairing personal use on a LAN.

In the present specification, the steps that describe the program stored in the storage media include not only processes executed in the above described sequence, but also processes that may be executed in parallel or independently.

In addition, as used in the specification, "system" refers to a whole device including a plurality of devices.

INDUSTRIAL APPLICABILITY

According to the present invention, it can be determined whether or not the other side communicating content data is located on a LAN or across a WAN.

The invention claimed is:

1. A data transmitting apparatus comprising:
   a transmitting unit connected to a first network and configured to transmit a check packet to a data receiving apparatus using a User Datagram Protocol (UDP);
   a control unit configured to receive a UDP acknowledgment message to the check packet from the data receiving apparatus, the acknowledgment message including acknowledgment information based on shared data shared with said data receiving apparatus;
   a computing unit configured to compute an expected acknowledgment information based on the shared data shared with said data receiving apparatus;
   a comparing unit configured to produce a comparison result for said data receiving apparatus based on the acknowledgment information and the expected acknowledgment information;
   a timer configured to determine whether a response time of the acknowledgment message is less than a predetermined time; and
   a judgment unit configured to judge whether subsequent content data transmitted to said data receiving apparatus will be limited in usage right based on the comparison result and the determination of the timer, if the UDP acknowledgement message is not received, the judgment unit determines that the data receiving apparatus is connected to the data transmitting apparatus through a second network, and the subsequent data content data transmitted is limited in usage right.

2. The apparatus of claim 1, wherein the transmitting unit is further configured to transmit a predetermined number of check packets to the data receiving apparatus.

3. The apparatus of claim 1, wherein one of the first network and the second network is a Local Area Network (LAN) and the other is a Wide Area Network (WAN).

4. A data transmitting methods comprising:
   transmitting a check packet to a data receiving apparatus using a User Datagram Protocol UDP;
   receiving an acknowledgment message to the check packet from the data receiving apparatus, the acknowledgment message including acknowledgment information based on shared data shared with said data receiving apparatus;

computing an expected acknowledgement information based on the shared data shared with said data receiving apparatus;

producing a comparison result for said data receiving apparatus based on the acknowledgment information and the expected acknowledgement information;

determining whether a response time of the acknowledgment message is less than a predetermined time; and judging whether subsequent content data transmitted to said data receiving apparatus will be limited in usage right based on the comparison result in the producing step and the determination in the determining step, if the UDP acknowledgement message is not received, the judgment unit determines that the data receiving apparatus is connected to the data transmitting apparatus through a second network, and the subsequent data content data transmitted is limited in usage right.

5. The method of claim 4, further comprising transmitting a predetermined number of check packets to the data receiving apparatus.

6. The method of claim 4, wherein one of the first network and the second network is a Local Area Network (LAN) and the other is a Wide Area Network (WAN).

7. A computer readable storage medium encoded with computer program instructions which cause a computer to execute a method of controlling a data transmission comprising:

transmitting a check packet to a data receiving apparatus using a User Datagram Protocol (UDP);

receiving a UDP acknowledgment message to the check packet from the data receiving apparatus, the acknowledgment message including acknowledgment information based on shared data shared with said data receiving apparatus;

computing an expected acknowledgement information based on the shared data shared with said data receiving apparatus;

producing a comparison result for said data receiving apparatus based on the acknowledgment information and the expected acknowledgement information;

determining whether a response time of the acknowledgment message is less than a predetermined time; and judging whether subsequent content data transmitted to said data receiving apparatus will be limited in usage right based on the comparison result in the producing step and the determination in the determining step, if the UDP acknowledgement message is not received, the judgment unit determines that the data receiving apparatus is connected to the data transmitting apparatus through a second network, and the subsequent data content data transmitted is limited in usage right.

8. The computer readable storage medium of claim 7, further comprising computer instructions configured to cause the computer to control transmitting a predetermined number of check packets to the data receiving apparatus.

9. The computer readable storage medium of claim 7, wherein one of the first network and the second network is a Local Area Network (LAN) and the other is a Wide Area Network (WAN).

10. A data transmitting apparatus comprising:

means for transmitting a check packet to a data receiving apparatus using a User Datagram Protocol (UDP);

means for receiving a UDP acknowledgment message to the check packet from the data receiving apparatus, the acknowledgment message including acknowledgment information based on shared data shared with said data receiving apparatus;

means for computing an expected acknowledgement information based on the shared data shared with said data receiving apparatus;

means for producing a comparison result for said data receiving apparatus based on the acknowledgment information and the expected acknowledgement information;

means for determining whether a response time of the acknowledgment message is less than a predetermined time; and means for judging whether subsequent content data transmitted to said data receiving apparatus will be limited in usage right based on the comparison result and the determination of means for determining, if the UDP acknowledgement message is not received, the judgment unit determines that the data receiving apparatus is connected to the data transmitting apparatus through a second network, and the subsequent data content data transmitted is limited in usage right.

11. The apparatus of claim 10, wherein the means for transmitting is further configured to transmit a predetermined number of check packets to the data receiving apparatus.

12. The apparatus of claim 10, wherein one of the first network and the second network is a Local Area Network (LAN) and the other is a Wide Area Network (WAN).

13. A data transmitting apparatus comprising:

a transmitting unit connected to a first network and configured to transmit a check packet to a data receiving apparatus using a Transfer Control Protocol (TCP);

a control unit configured to receive a TCP acknowledgment message to the check packet from the data receiving apparatus, the acknowledgment message including acknowledgment information based on shared data shared with said data receiving apparatus;

a computing unit configured to compute an expected acknowledgment information based on the shared data shared with said data receiving apparatus;

a comparing unit configured to produce a comparison result for said data receiving apparatus based on the acknowledgment information and the expected acknowledgment information;

a timer configured to determine whether a response time of the acknowledgment message is less than a predetermined time; and a judgment unit configured to judge whether subsequent content data transmitted to said data receiving apparatus will be limited in usage right based on the comparison result and the determination of the timer, if the TCP acknowledgement message is received, the judgment unit determines that the data receiving apparatus is connected to the data transmitting apparatus through a second network, and the subsequent data content data transmitted is limited in usage right.

14. The apparatus of claim 13, wherein the transmitting unit is further configured to transmit a predetermined number of check packets to the data receiving apparatus.

15. The apparatus of claim 13, wherein one of the first network and the second network is a Local Area Network (LAN) and the other is a Wide Area Network (WAN).

16. A data transmitting method, comprising:

transmitting a check packet to a data receiving apparatus using a Transfer Control Protocol (TCP);

receiving an acknowledgment message to the check packet from the data receiving apparatus, the acknowledgment message including acknowledgment information based on shared data shared with said data receiving apparatus;

computing an expected acknowledgement information based on the shared data shared with said data receiving apparatus;

producing a comparison result for said data receiving apparatus based on the acknowledgment information and the expected acknowledgement information;

determining whether a response time of the acknowledgment message is less than a predetermined time; and judging whether subsequent content data transmitted to said data receiving apparatus will be limited in usage right based on the comparison result in the producing step and the determination in the determining step, if the TCP acknowledgement message is received, the judgment unit determines that the data receiving apparatus is connected to the data transmitting apparatus through a second network, and the subsequent data content data transmitted is limited in usage right.

17. The method of claim 16, further comprising transmitting a predetermined number of check packets to the data receiving apparatus.

18. The method of claim 16, wherein one of the first network and the second network is a Local Area Network (LAN) and the other is a Wide Area Network (WAN).

19. A computer readable storage medium encoded with computer program instructions which cause a computer to execute a method of controlling a data transmission comprising:

transmitting a check packet to a data receiving apparatus using a Transfer Control Protocol (TCP);

receiving a TCP acknowledgment message to the check packet from the data receiving apparatus, the acknowledgment message including acknowledgment information based on shared data shared with said data receiving apparatus;

computing an expected acknowledgement information based on the shared data shared with said data receiving apparatus;

producing a comparison result for said data receiving apparatus based on the acknowledgment information and the expected acknowledgement information;

determining whether a response time of the acknowledgment message is less than a predetermined time; and judging whether subsequent content data transmitted to said data receiving apparatus will be limited in usage right based on the comparison result in the producing step and the determination in the determining step, if the TCP acknowledgement message is received, the judgment unit determines that the data receiving apparatus is connected to the data transmitting apparatus through a second network, and the subsequent data content data transmitted is limited in usage right.

20. The computer readable storage medium of claim 19, further comprising computer instructions configured to cause the computer to control transmitting a predetermined number of check packets to the data receiving apparatus.

21. The computer readable storage medium of claim 19, wherein one of the first network and the second network is a Local Area Network (LAN) and the other is a Wide Area Network (WAN).

22. A data transmitting apparatus comprising:

means for transmitting a check packet to a data receiving apparatus using a Transfer Control Protocol (TCP);

means for receiving a TCP acknowledgment message to the check packet from the data receiving apparatus, the acknowledgment message including acknowledgment information based on shared data shared with said data receiving apparatus;

means for computing an expected acknowledgement information based on the shared data shared with said data receiving apparatus;

means for producing a comparison result for said data receiving apparatus based on the acknowledgment information and the expected acknowledgement information;

means for determining whether a response time of the acknowledgment message is less than a predetermined time; and means for judging whether subsequent content data transmitted to said data receiving apparatus will be limited in usage right based on the comparison result and the determination of means for determining, if the TCP acknowledgement message is received, the judgment unit determines that the data receiving apparatus is connected to the data transmitting apparatus through a second network, and the subsequent data content data transmitted is limited in usage right.

23. The apparatus of claim 22, wherein the means for transmitting is further configured to transmit a predetermined number of check packets to the data receiving apparatus.

24. The apparatus of claim 22, wherein one of the first network and the second network is a Local Area Network (LAN) and the other is a Wide Area Network (WAN).

* * * * *

UNITED STATES PATENT AND TRADEMARK OFFICE
CERTIFICATE OF CORRECTION

| | | |
|---|---|---|
| PATENT NO. | : 7,626,943 B2 | Page 1 of 1 |
| APPLICATION NO. | : 10/503931 | |
| DATED | : December 1, 2009 | |
| INVENTOR(S) | : Takehiko Nakano | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1292 days.

Signed and Sealed this

Second Day of November, 2010

David J. Kappos
*Director of the United States Patent and Trademark Office*